POLARIZATION DIVERSITY RECEIVER

Filed April 27, 1960 2 Sheets-Sheet 1

INVENTOR.
MARTIN KATZIN
BY Hurvitz & Rose
ATTORNEYS

July 10, 1962 M. KATZIN 3,044,062

POLARIZATION DIVERSITY RECEIVER

Filed April 27, 1960 2 Sheets-Sheet 2

INVENTOR.
MARTIN KATZIN
BY Hurvitz & Rose
ATTORNEYS

United States Patent Office 3,044,062

Patented July 10, 1962

3,044,062

POLARIZATION DIVERSITY RECEIVER

Martin Katzin, 154 Fleetwood Terrace, Silver Spring, Md.

Filed Apr. 27, 1960, Ser. No. 24,963
12 Claims. (Cl. 343—100)

The present invention relates generally to systems for receiving signal in the presence of noise on the basis of polarization difference between the signal and noise, and more particularly to polarization diversity receivers which may form part of a more extensive system such as a communication network, a radar system, or the like, in which discrimination against undesired signal or noise is provided in terms of difference of polarization of transmitted wave energy representing a desired signal and of undesired signal, the latter being denominated noise because it degrades the desired signal.

Briefly describing a preferred embodiment of the invention, it is assumed that a distinguishing characteristic exists as between the noise signal and the desired signal in addition to a difference in polarization of wave energies representing said signals. The term "noise" herein is not restricted to random noise but may be any undesired signal which tends to degrade a desired signal. Such difference may, for example, be represented by a band width difference, as representing one simple type of difference, but the invention is broadly applicable regardless of the character of difference so long as that difference permits a sample of the noise to be isolated from signal plus noise.

In accordance with the invention the polarization of the noise signal is sensed, and converted to a control signal. The control signal is in turn utilized to control the polarization for which a main receiver channel provides no noise output, but some signal output, on the assumption that a polarization difference exists between the signal and the noise. More specifically the noise signal, having been isolated from signal plus noise, is divided into two polarization components. These may be denominated V and the H components, for convenience, and these designations may indicate that vertical and horizontal polarization components may be utilized, but without detracting from the generality of the exposition, since the specific orientations selected for polarization are arbitrary. In a broad sense then V and H represent differently directed polarization components, which may be but need not be orthogonal. V and H components of the noise are equalized in amplitude and in phase, in response to control signals derived from V and H comparison devices, and these same control signals are utilized to control the gain and the phase shift of V and H main channels which carry signal plus noise. At the output of the main channels the noise signals will then be equal in amplitude and in phase, since they were so in the supplementary or noise per se channels, but the desired signal components will in general be neither equal in amplitude nor co-phasal. Accordingly by subtracting the outputs of the main channels, the noise signal may be balanced and a residual desired signal remain.

It is accordingly a broad object of the present invention to provide a system for distinguishing between signal and noise on the basis of differences in the polarizations of wave energies representative thereof.

It is another object of the present invention to provide a system for distinguishing desired signals from noise when the noise signal is considered to be any degrading signal having some difference characteristic with respect to desired signals which can be distinguished, in addition to a difference of polarization.

It is still another object of the invention to provide a system for distinguishing signal from noise, wherein the term noise means undesired signal, by so treating the noise signal alone in two channels that the outputs of the channels may be cancelled one with the other, and similarly treating the signal plus noise in two channels, so that the outputs of the latter channels may provide for cancellation of the noise without cancellation of the desired signal, provided that a difference of polarization exists between the signal and the noise.

The above and still further objects, features and advantages of the present invention will become apparent upon consideration of the following detailed description of one specific embodiment thereof, especially when taken in conjunction with the accompanying drawings, wherein.

Figures 1, 2:
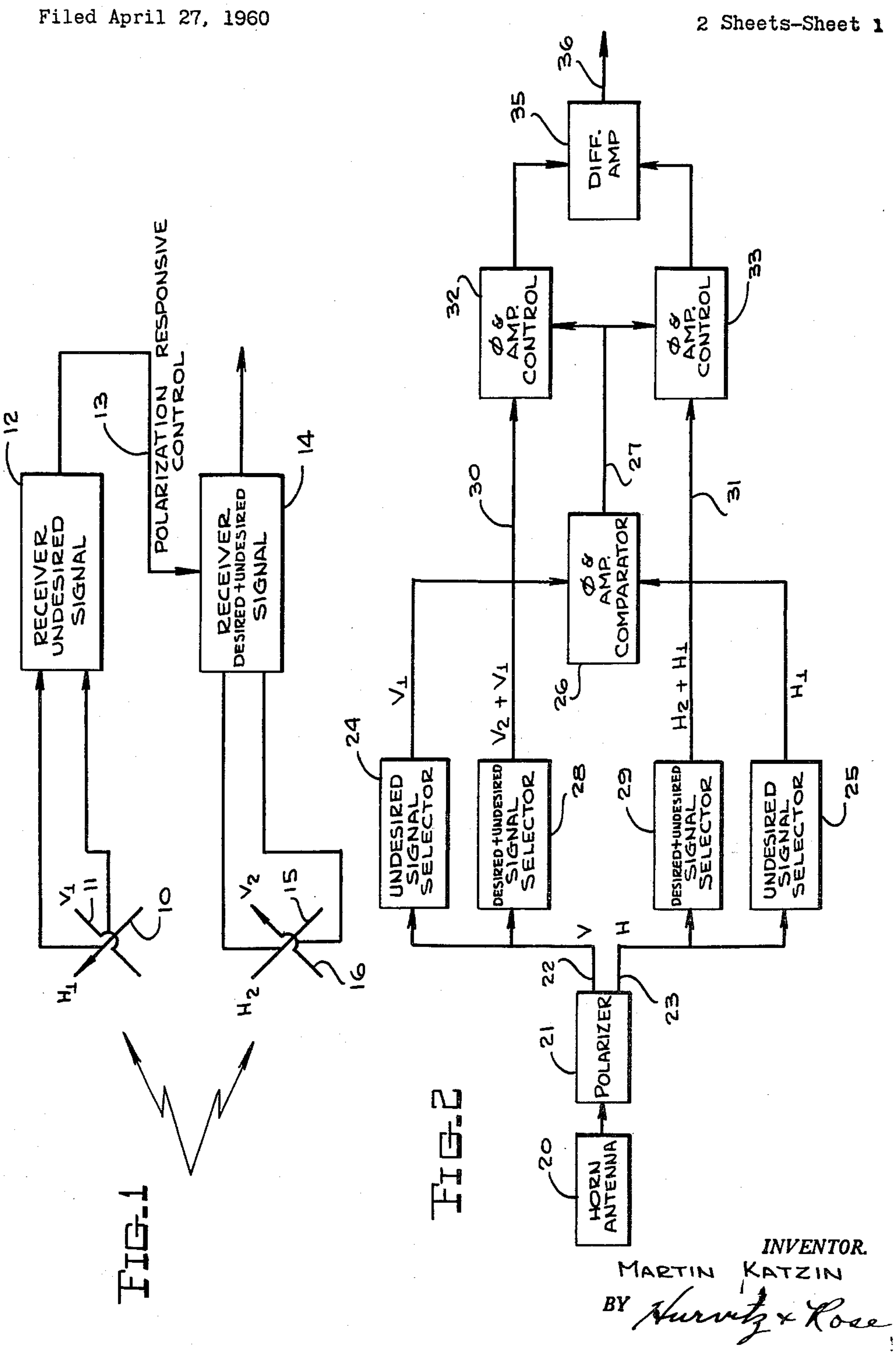
FIGURE 1 is a block diagram of a simplified or elementary system in accordance with the invention.
FIGURE 2 is a block diagram of a modified form of the invention, in simplified form.

Referring now to FIGURE 1 of the accompanying drawings, there is illustrated two receiver channels, each provided with its own antenna system. The antenna systems are responsive to components of polarization of the received energy waves. The character of the received waves other than in respect to polarization, may be of various types. For example, in a communication system, the undesired or noise signal may be a jamming signal. The frequency spectrum of the jamming signal may be far wider than the frequency spectrum of the desired signal, and in such case the receiver which is designated to receive the undesired signal to the exclusion of the desired signal may do so on the basis of band width effects. In the case of a radar system, clutter may be distinguished from a desired signal in terms of the Doppler frequency spectrum of the clutter and this is especially true in respect to clutter produced by the surface of the sea, in which case the receiver of the present system may be utilized as part of a radar system for anti-submarine warfare, or ASW radar.

Sea clutter at small depression angles, i.e. long range sea clutter, is primarily due to small facets, whose size is of the order of one wave length in perimeter. These facets have a preferred polarization property, and move with the surface current. In addition to the surface current Doppler frequencies generated by these facets, there is a velocity spectrum having a width of about two knots between half power points. A radar system, to be fairly useful in anti-submarine warfare, must be capable of distinguishing normal sea return from that due to a wake due to a moving submerged vessel. In accordance with the present invention the combined polarization and Doppler frequency spectrum of the wake is found to be different from that of the normal sea, and this difference provides the basis for discrimination. The present invention includes an arrangement whereby the radar receives the clutter alone on a polarization determining radar receiver. The latter automatically sets itself, by means of internally generated control signals, for the polarization giving maximum rejection of this return. The control signal controls reception in an independent channel to have this same polarization, whereupon any significant deviation from the average polarization property is manifest as a desired signal.

In FIGURE 1 of the drawings, reference numeral 10 denotes a horizontally polarized or H antenna, and the reference numeral 11 a vertically polarized or V antenna. These are connected to a receiver 12 designed to receive undesired or noise signals associated with a desired signal, to the exclusion of the latter. The receiver 12 is designed, in response to the H and V signal components provided by the antennas 10 and 11, respectively, to generate a control signal representative of those modifications in amplitude and phase of the components H and V which would be required to equalize these. The term equalize is taken to mean equality of amplitude and alignment of phase, i.e. one of either zero phase difference or 180° phase difference may be utilized. The control signal provided by the receiver 12 is supplied by a channel 13 to a receiver 14 which receives desired signal plus the undesired signal or noise. The receiver 14 is provided with V and H antennas 15 and 16, duplicating the antennas 10 and 11, respectively, and in response to the control signal provided over the channel 13 modifies the amplitudes and phases of the V and H signals so received in precisely the same manner as was the case for the receiver 12. Accordingly, the noise or undesired signal component received by the antennas 15 and 16 are processed by the receiver 14 in such sense that they may be cancelled, whereas any desired signal which has a polarization component different from the noise component cannot be effectively cancelled if subjected to the same controls. There is therefore at the output of the receiver 14 a residual signal representative of the desired signal to the exclusion of noise.

Reference is now made to FIGURE 2 of the accompanying drawings which indicates more completely the mode of operation of the broadly illustrated system of FIGURE 1. In the system of FIGURE 2 is provided a horn antenna 20, which feeds a polarizer device 21 serving the function of separating a received signal into components, which may be vertical and horizontal components V and H, in channels 22 and 23, respectively. The V and H signals so separated contain a desired signal and a superposed undesired signal or a noise signal, which may have different polarizations, and which may be separable on a basis of some characteristic thereof, such as frequency spectrum. The undesired signal, in its two components, is identified by reference designations $V_1$ and $H_1$, and the desired signal by reference designations $V_2$ and $H_2$. The $V_1$ and $H_1$ components are separated from the $V_2$ and $H_2$ components by means of the signal selectors 24 and 25, respectively (which may be filters), and these components are applied to a phase and amplitude comparison device 26 which generates control signals on a lead 27, these control signals being representative of relative amplitudes of the components $V_1$ and $H_1$ and of relative phases thereof. Desired signal plus noise are selected by the selector circuits 28 and 29, respectively, the outputs of which are designated $V_2+V_1$ and $H_2+H_1$, where $V_2$ and $H_2$ represent vertical and horizontal polarization components of the desired signal. These components, applied to leads 30 and 31, respectively, are passed through phase and amplitude control devices 32 and 33, the device 32 controlling the phase and amplitude of the signal $V_2+V_1$, and the device 32 of the signal $H_2+H_1$. The controls affected are such as to modify the amplitudes of the signals $V_2+V_1$ and $H_2+H_1$ in such manner that the components $V_1$ and $H_1$ become equal in amplitude, and the phases of $V_1$ and $H_1$ become aligned, i.e. at 0° or 180° difference. Assuming no amplitude difference and a zero degree phase difference, the outputs of the phase and amplitude controls 32 and 33 are applied to a differential amplifier 35, wherein the components $V_1$ and $H_1$ balance out, leaving on the output lead 36 a signal representative of $V_2$ and $H_2$ only, and consequently of the desired signal alone to the exclusion of the undesired signal.

Figure 3:
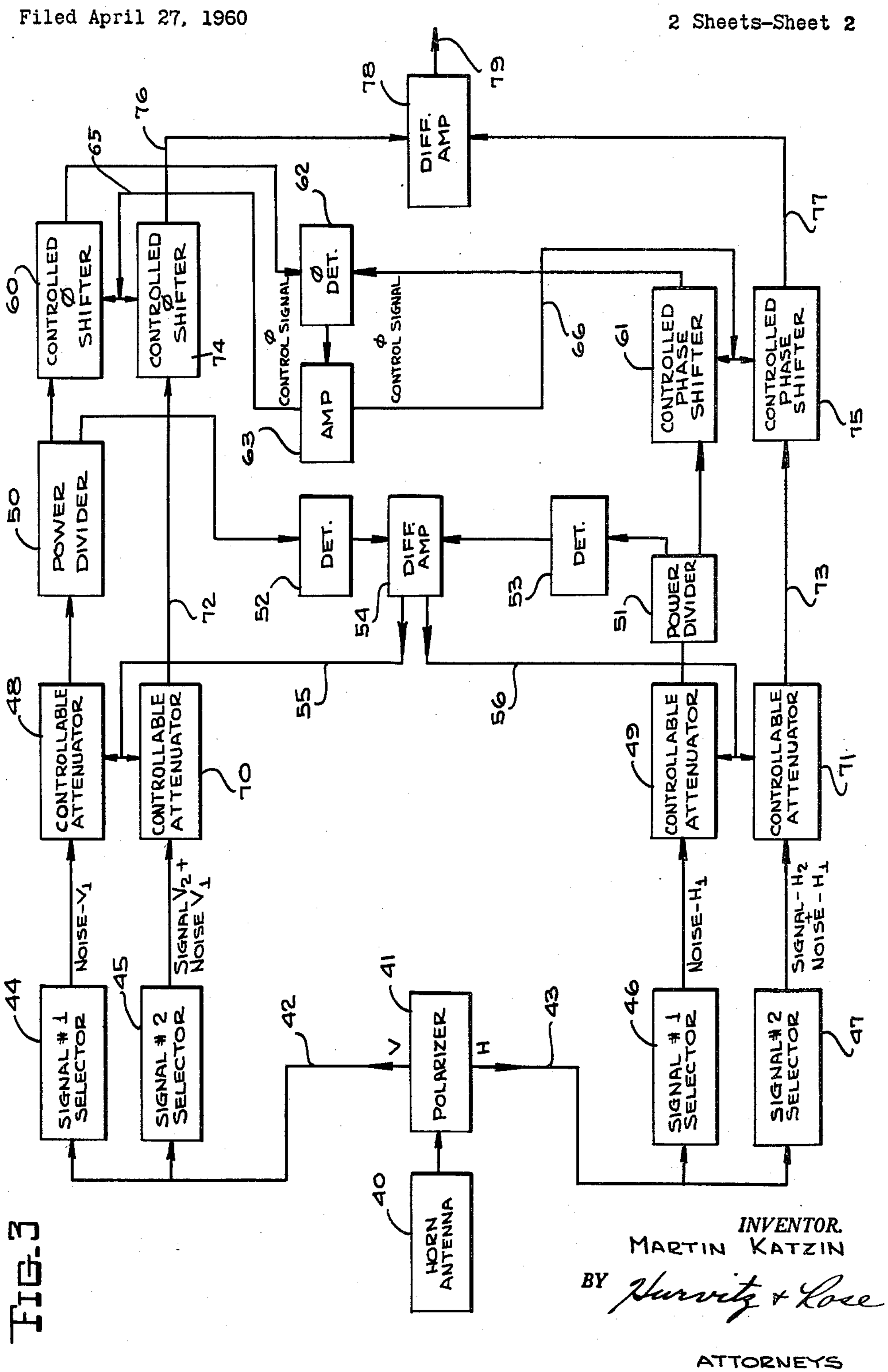
FIGURE 3 is a complete functional diagram of a preferred embodiment of the invention.

Reference is now made to FIGURE 3 of the accompanying drawing, wherein is illustrated, in the form of a functional block diagram, a complete system representing a preferred embodiment of the invention. In the system of FIGURE 3 the reference numeral 40 represents a suitable antenna, which may preferably be of the horn type, and which feeds a polarizer 41 adapted to separate the signal received by the horn antenna 40 into vertical and horizontal components on leads or channels 42 and 43, respectively. It will be understood that the utilization of vertical and horizontal components is a matter of choice, representing a convenient mode of describing and processing cross polarized signals. The vertically polarized component of the complete received signal, $V_1$ and $V_2$, as seen by the horn antenna 40 is applied in parallel to signal selectors 44 and 45, of which signal selector 44 responds only to a noise component $V_1$ of the total received signal. In the case of a jammed communication signal, where noise jamming is employed, the signal selector 44 may be a filter or receiver, which is so tuned as to respond to the noise alone to the exclusion of the desired signal, and this may normally be done on the basis that a noise jammer is a wide band device in comparison with a communication channel, which is narrow band. The signal selector 45 passes the vertically polarized component of the entire signal, i.e. desired signal plus noise $V_1+V_2$. The noise signal is denominated by the subscript 1 and the desired signal by the subscript 2.

Similarly a horizontally polarized component of the entire received signal, $H_1+H_2$, applied to channel 43 is separated in selectors 46 and 47 respectively, the signal selector 46 abstracting the horizontally polarized component of the noise $H_1$, while the signal selector 47 passes the horizontally polarized component of both noise and desired signal, $H_1$ and $H_2$.

Considering now the noise channels alone, the $V_1$ and $H_1$ components of the noise are passed through controllable attenuators 48 and 49, the outputs of the attenuators 48 and 49 consisting of power dividers 50 and 51, respectively. Power divider 50 supplies a portion of the signal supplied thereto to an amplitude detector 52 while power divider 51 supplies the like portion of the signals applied thereto by the controllable attenuator 49, to an amplitude detector 53. The detectors 52 and 53 supply their outputs to a difference amplifier 54, the output of which consists of two D.-C. signals on leads 55 and 56, respectively, these signals representing the difference of the detected input to the difference amplifier 54 taken in opposite senses. If the $V_1$ and $H_1$ components are equal, the detectors 52 and 53 will be supplied with signals of equal amplitude and the output of the difference amplifier 54 as seen on the leade 55 and 56 will be zero. In such case the attenuators 48 and 49 will be subjected to zero level control signals, and accordingly will introduce a normal or zero level attenuation. If on the other hand the output of the detector 52 is the larger and the output of the detector 53 the smaller, indicating that the $V_1$ component is larger than the $H_1$ component smaller, signal on the lead 55 will be positively going, and on the lead 56 negatively going, with respect to the zero level, whereby the controllable attenuators 48 and 49 will be adjusted in respect to gain in opposite senses, and the control will be such as to reduce the output of the differential amplifiers to zero. It will be clear from the discussion that attenuation may be positive or negative, with respect to reference level. In a sense, then, the differential amplifier 54 is the error detector of a servo system, which tends to reduce amplitude error to zero. If the $H_1$ component should be greater than the $V_1$ component, the differential output from differential amplifier 54 will be positive on lead 56 and negative on lead 55, so that attenuation introduced in the channels will be again in opposite senses such as to tend to equalize the outputs of the attenuators.

The equalized $V_1$ and $H_1$ signals are now applied to controlled phase shifters 60 and 61, respectively. The outputs of the latter are applied to a phase detector, 62, which supplies to an amplifier 63 a signal representative of the phase difference and of the sign of the phase difference of the two inputs of the phase detector 62. The amplifier 63 is arranged to provide oppositely phased D.-C. control signals to the controlled phase shifters 60 and 61, via leads 65 and 66, respectively, in opposite senses, so as to tend to equalize the phases of the output signals derivable from the controlled phase shifters 60 and 61. The phase detector 62 is then again the error detector of a servo, wherein the character of the error is a phase error, and wherein the servo loop tends to reduce the error to zero regardless of its sign.

There is now available on leads 55 and 56 two control signals, which represent the change in gain which must be introduced to the $V_2+V_1$ signal supplied by the signal selector 45 and to the $H_2+H_1$ signal supplied by the signal selector 47, in order to equalize the $V_1$ and $H_1$ components of the latter signals. These control signals, available on leads 55 and 56 are supplied to controllable attenuators 70 and 71, which duplicate the controllable attenuators 48 and 49. It then follows that at the outputs of the attenuators 70 and 71, i.e. on leads 72 and 73 respectively, are two signals $V_2+V_1$ and $H_2+H_1$, respectively, wherein the $V_1$ and $H_1$ components are equal, but wherein, in general, $V_2$ and $H_2$ components are not equal, and would only be equal if the polarization of the desired signal were the same as the polarization of the noise signal.

The amplitude equalized signals available on leads 72 and 73 are applied to controlled phase shifters 74 and 75, which duplicate, respectively, the controlled phase shifters 60 and 61, and which are in fact controlled by the same control signals as are the latter, via leads 65 and 66. Accordingly, at the output of the controlled phase shifters 74 and 75, i.e. on leads 76 and 77, appear the signals $V_2+V_1$ and $H_2+H_1$, respectively, but the $V_1$ and $H_1$ components of these signals are equalized in amplitude and in phase, whereas the $V_2$ and $H_2$ components are, in general, not equalized. The signals on channels 76 and 77 are applied to a difference amplifier, 78, which serves to cancel the $V_1$ and $H_1$ components of the total signal applied thereto, and to combine algebraically the $V_2$ and $H_2$ components, providing an output in response to the latter on lead 79.

In order to clarify the operation of the system of FIGURE 3, by way of example, it may be assumed that a noise signal is intercepted, which is plane polarized 45° from the vertical taken clockwise, whereas a desired signal simultaneously intercepted is planely polarized at 90° with respect to the noise signal, i.e. at 45° taken counterclockwise to the vertical. In this set of circumstances, the V and H components will be equal, in both signals, and accordingly no control signal need be supplied to the controllable attenuators 48 and 70, 49 and 71. Similarly, the phases of the noise signal components $V_1$ and $H_1$ may be equal, so that no phase shift control signal need be supplied. Therefore, no control is required or obtainable from the system for the specific set of circumstances specified, i.e. $V_1$ and $H_1$ equal and co-phasal. So far as the signal plus noise channels are concerned, the $V_1$ and $H_1$ components pass through without modification of either amplitude or phase, these signals being co-phasal and of equal amplitude at the output terminal. The $V_2$ and $H_2$ signals are likewise of equal amplitudes, since they represent 45° polarization. However, since the polarization is counterclockwise polarization, the phase relation of the $V_2$ and $H_2$ components are opposite instead of equal. Accordingly the difference amplifier 78 provides twice the output available on either input channels 76 or 77 alone, and a maximum output signal representative of the desired signal to the exclusion of the noise signal becomes available on output lead 79.

For any set of circumstances conceivable, i.e. whether or not one or the other polarizations is rotating, or if both are rotating, whether the rotation is in the same sense or in opposite sense, an output signal appears from the difference amplifier 78 whenever the polarization of the two signals is not the same.

The control effects, in the several channels, involving control of amplitude and phase of V and H components can be arranged to take place in substantially real time, implying that these occur substantially instantaneously. In terms of current state of the art capabilities, this control can be effected in a few milli-microseconds. Such rapidity of response enables the system to achieve and maintain differential response as between signal and noise, in the case of pulse radar systems, for example, substantially throughout each pulse.

This capability is important in maintaining the discrimination against the noise in spite of variations in the polarization characteristics of said noise with time.

While I have described and illustrated one specific embodiment of the present invention, it will become apparent that variations of the specific details of construction may be resorted to without departing from the true spirit and scope of the invention as defined in the appended claims.

What I claim is:

1. A signal receiver for receiving desired signals having a first polarization, wherein said first signals are degraded by undesired or noise signals having a second polarization, different than said first polarization, said signal receiver including means for receiving said noise signal alone in a first channel, means for receiving said desired signal plus said noise signal in a second channel, means responsive to signal received by said first channel to generate control signal representative of polarization of said noise signal, and means responsive to said control signal for controlling the response of said second channel as a function of polarization of signal received thereby so as to maximize signal to noise ratio at the output of said second channel.

2. A signal receiver system for receiving desired signal in presence of noise, wherein said desired signal and said noise are differently polarized wave transmissions, means for separating said noise signal into separate components representative of components of polarization of said noise signal, means for separating said desired signal plus said noise into separate components representative of corresponding components of polarization of said desired signal plus said noise, means for equalizing said noise components in respect to amplitude and phase, said last means including control signal generation devices responsive to comparison of amplitudes and phases of said noise components, means responsive to said control signal for controlling the relative amplitudes and phases of said desired signal plus noise components, and means for differentially combining said last named components.

3. In a system for distinguishing desired signal from noise on the basis of differences in their polarization vectors, means for dividing said desired signal plus noise into component signals representative of components of a polarization vector representative of said noise alone and a polarization vector representative of said desired signal, means responsive only to control signal representative of polarization of said noise to the exclusion of said desired signal for substantially identically controlling in respect to both amplitude and phase all said component signals while equalizing only said components of said polarization vector representative of said noise alone, and means for obtaining the algebraic difference of all said component signals as controlled by said means for controlling.

4. In a system for distinguishing first and second wave energy signals on the basis of a difference in polarization vectors of said signals, means for sensing the relative amplitudes and phases of two polarization components of one of said signals alone as a measure of the polarization vector of said one of said signals alone, means for modifying said relative amplitudes and phases of said one of said signals alone so as to equalize said amplitudes and phases, means for correspondingly modifying the relative amplitudes and phases of two polarization components of the other of said signals, and means for deriving a signal representative only of the other of said signals from the modified signals last mentioned.

5. In a system for processing first and second signals, wherein said signals overlap in frequency but are not co-extensive in frequency spectrum, and wherein said signals have distinguishable components of polarization vectors, denominated $V_1$ and $H_1$ for said first signal and $V_2$ and $H_2$ for said second signal, means for identically modifying the amplitudes and phases of $V_1$ and $V_2$ and of $H_1$ and $H_2$ so as to equalize the amplitudes and align the phases of $V_1$ and $H_1$ without necessarily equalizing the amplitudes and aligning the phases of $V_2$ and $H_2$, and means for additively combining $V_1$ and $H_1$ with $V_2$ and $H_2$ so as to cancel $V_1$ and $H_1$ and to leave a residue representative of $V_2$ and $H_2$.

6. The combination according to claim 5 wherein $V_1$ and $H_1$, as well as $V_2$ and $H_2$, are orthogonal.

7. In a system for abstracting a first desired signal from a second noise signal, wherein said signals have distinguishable electrical characteristics, in addition to differences in polarization components, and wherein the polarization components of said first desired signal are $V_2$ and $H_2$, and of said second noise signal are $V_1$ and $H_1$, means for identically modifying the amplitudes and phases of $V_1$ and $V_2$, as well as of $H_1$ and $H_2$, so as to equalize the amplitudes of $V_1$ and $H_1$ and align the phases of $V_1$ and $H_1$ without necessarily equalizing the amplitudes and aligning the phases of $V_2$ and $H_2$, and means for combining $V_1$, $V_2$, $H_1$, $H_2$ so as to cancel $V_1$ and $H_1$ and to leave a residue representative only of $V_2$ and $H_2$.

8. The combination according to claim 7 wherein $V_1$ is orthogonal to $H_1$ and $V_2$ is orthogonal to $H_2$.

9. In a system for discriminating between a signal $S_1$ and a signal $S_2$, where $S_1$ is undesired and $S_2$ is desired plus undesired and where $S_1$ and $S_2$ have at least different polarizations, means for dividing $S_1$ into polarization vector components $V_1$ and $H_1$, means for dividing $S_2$ into polarization vector components $V_2$ and $H_2$, means for relatively modifying the relative amplitudes of $V_1$ and $H_1$ so as to equalize $V_1$ and $H_1$ and for correspondingly modifying the relative amplitudes of $V_2$ and $H_2$, means for relatively modifying the relative phases of $V_1$ and $H_1$ so as to align said relative phases and for correspondingly relatively modifying the phases of $V_2$ and $H_2$, and means for additively combining $V_1$ with $H_1$ and $V_2$ with $H_2$ so as to cancel $V_1$ with $H_1$.

10. In a system for discriminating between a signal $S_1$ and a signal $S_2$, where $S_1$ and $S_2$ have different polarizations and have at least one other distinguishing characteristic, means for analyzing said signal $S_1$ into polarization components $V_1$ and $H_1$ and said signal $S_2$ into polarization components $V_2$ and $H_2$, means for separating said components $V_1$, $V_2$, $H_1$, $H_2$ into first, second, third and fourth separate channels containing respectively, only $V_1$, $H_1$, $V_2$ and $V_1$, $H_2$ and $H_1$, on the basis of said distinguishing characteristic, means for controlling the transfer characteristic of said first and second channels so as to equalize amplitude and align phases of $V_1$ and $H_1$, means for correspondingly controlling the transfer characteristics and phases of said third and fourth channels, and means for additively combining the outputs of said third and fourth channels so as to cancel $V_1$ with $H_1$ and to leave a residue only to $V_2$ and $H_2$.

11. In a system for receiving desired signal in the presence of noise, wherein said desired signal and said noise are wave energies having different polarizations, means responsive to polarizations of said noise alone for modifying the relative amplitudes of polarization components of a composite signal composed of said desired signal and said noise such that the noise components are cancellable, and means responsive to said composite signal for cancelling said noise components, leaving a residue composed of desired signal component only.

12. The combination according to claim 11 wherein said polarization components are orthogonal.

No references cited.